(12) United States Patent
Meacham

(10) Patent No.: US 7,643,809 B1
(45) Date of Patent: ***Jan. 5, 2010

(54) METHOD AND APPARATUS FOR TUNING RF INTEGRATED LC FILTERS

(75) Inventor: Daniel R. Meacham, La Jolla, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 11/220,073

(22) Filed: Sep. 6, 2005

Related U.S. Application Data

(63) Continuation of application No. 10/071,347, filed on Feb. 8, 2002, now Pat. No. 6,940,358.

(60) Provisional application No. 60/267,312, filed on Feb. 8, 2001.

(51) Int. Cl.
*H04B 1/18* (2006.01)

(52) U.S. Cl. .............. 455/193.2; 455/180.3; 455/197.2; 455/77; 331/117 R; 331/16

(58) Field of Classification Search .............. 455/193.2, 455/315, 197.2, 333, 180.3, 136, 140, 165.1, 455/147, 180.1–2, 173.1, 178.1, 77, 75, 87, 455/196.1, 197.3, 193.1; 311/16, 17; 331/111, 331/117 R, 16; 330/259, 270
See application file for complete search history.

(56) References Cited

U.S. PATENT DOCUMENTS

| | | | |
|---|---|---|---|
| 4,900,950 A * | 2/1990 | Dubujet ...................... 327/143 |
| 5,053,723 A | 10/1991 | Schemmel | |
| 5,148,280 A * | 9/1992 | Wignot et al. ............. 455/180.1 |
| 5,625,325 A * | 4/1997 | Rotzoll et al. ................. 331/16 |
| 5,699,024 A * | 12/1997 | Manlove et al. ............. 331/111 |
| 5,955,783 A * | 9/1999 | Ben-Efraim et al. ........ 257/728 |
| 6,013,958 A | 1/2000 | Aytur | |
| 6,069,505 A | 5/2000 | Babanezhad | |
| 6,181,218 B1 | 1/2001 | Clark et al. | |
| 6,211,745 B1 | 4/2001 | Mucke et al. | |
| 6,236,843 B1 | 5/2001 | Goto | |
| 6,686,804 B1 | 2/2004 | Adams et al. | |
| 6,738,601 B1 | 5/2004 | Rofougaran et al. | |
| 7,092,043 B2 * | 8/2006 | Vorenkamp et al. ......... 348/726 |

* cited by examiner

*Primary Examiner*—John Lee

(57) ABSTRACT

Using low impedance switches and coupling to a virtual ground, one or more capacitors are selectively switched into or out of an inductive-capacitive resonant circuit portion of an integrated circuit filter to alter the resonant frequency based on a phase difference between the resonant frequency and a reference frequency. The capacitors are sized for a sequence of total capacitances proceeding by halves or doubles between values corresponding to minimum and maximum desired frequency adjustments, allowing a binary count of pulses representative of the phase difference to address the correct combination of capacitors. An exact or ratioed replica of the inductive-capacitive resonant circuit, controlled by the same capacitance selection signal, may be used as a frequency-selective amplifier load or matching network, or to form a ladder filter.

20 Claims, 1 Drawing Sheet

METHOD AND APPARATUS FOR TUNING RF INTEGRATED LC FILTERS

CROSS-REFERENCE TO RELATED APPLICATION(S)

This application is a continuation of prior U.S. patent application Ser. No. 10/071,347 filed on Feb. 8, 2002 now U.S. Pat. No. 6,940,358 which claims benefit to U.S. Provisional Application No. 60/267,312 filed on Feb. 8, 2001.

TECHNICAL FIELD OF THE INVENTION

The present invention is directed, in general, to integrated circuit radio frequency filters and, more specifically, to passive integrated circuit inductive-capacitive filters providing wide dynamic range.

BACKGROUND OF THE INVENTION

In all radio communication systems, a narrow-band filter is required to shield the receiver from unwanted, out-of-band radio signals that would otherwise desensitize the receiver. As radio systems move from discrete component implementations toward integrated circuit solutions, the cost of external filters becomes an increasingly larger portion of the total bill-of-materials for the system. As a result, on-chip integrated circuit filters formed with the receiver circuit would be preferable.

Due to the variation of on-chip inductors and capacitors, however, the problem of properly tuning integrated circuit filters has not been satisfactorily solved unless an active filter topology is employed. However, active filters have extremely limited dynamic range, and are therefore best suited for use in base-band or low intermediate frequency (IF) implementations. Accordingly, passive inductive-capacitive (LC) filters are a better alternative for replacing discrete component radio frequency (RF) filters in a radio communication system, since such filters contribute very little degradation to the receiver noise figure and add very little distortion to the incoming signal.

There is, therefore, a need in the art for a passive, inductive-capacitive integrated circuit radio frequency filter that may be incorporated into the design of integrated circuit radio receiver systems.

SUMMARY OF THE INVENTION

To address the above-discussed deficiencies of the prior art, it is a primary object of the present invention to provide, for use in a radio frequency integrated circuit filter, one or more capacitors that are selectively switched into or out of an inductive-capacitive resonant circuit portion of an integrated circuit filter, using low impedance switches and coupling to a virtual ground, to alter the resonant frequency based on a phase difference between the resonant frequency and a reference frequency. The capacitors are sized for a sequence of total capacitances proceeding by halves or doubles between values corresponding to minimum and maximum desired frequency adjustments, allowing a binary count of pulses representative of the phase difference to address the correct combination of capacitors. An exact or ratioed replica of the inductive-capacitive resonant circuit, controlled by the same capacitance selection signal, may be used as a frequency-selective amplifier load or matching network, or to form a ladder filter.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
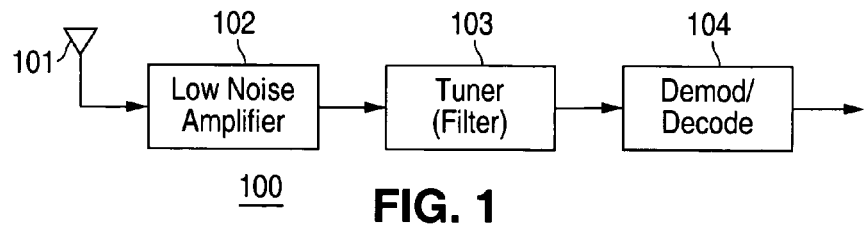
FIG. 1 depicts a radio receiver system including a passive inductive-capacitive integrated circuit filter according to one embodiment of the present invention.

FIG. 1 depicts a receiver system including a passive inductive-capacitive integrated circuit filter according to one embodiment of the present invention. The entire receiver 100, including the functional components therein which are described below, is preferably formed within a single integrated circuit. Receiver 100 includes, in the example shown, an antenna 101 for receiving wireless communications signals, preferably radio frequency (RF) signals although the present invention may also be applicable to, for example, microwave signals.

In the exemplary embodiment, signals received by antenna 101 are amplified by a low noise amplifier 102, which is connected between antenna 101 and tuner 103. Tuner 103, which contains a passive, integrated circuit inductive-capacitive (LC) filter as described in further detail below, filters the received signal and passes the filtered signal to a demodulator/decoder 105. The decoded signal is then passed to other circuitry (not shown) for use in generating an audio and/or video output or other data or control signals.

Figure 2:
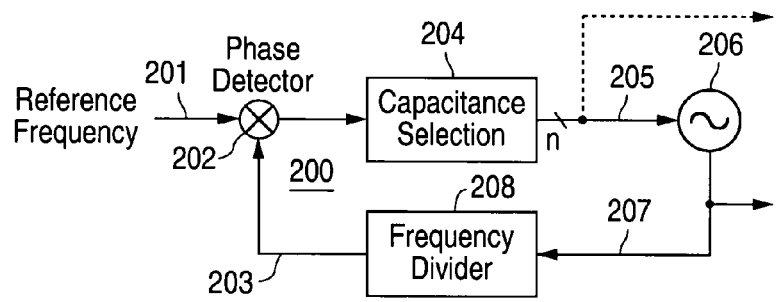
FIG. 2 illustrates in greater detail a frequency synthesizer loop for capacitive-tuning of a receiver system including a passive inductive-capacitive integrated circuit filter according to one embodiment of the present invention.

FIG. 2 illustrates in greater detail a frequency synthesizer loop for capacitive-tuning of a receiver system including a passive inductive-capacitive integrated circuit filter according to one embodiment of the present invention. Synthesizer loop 200, implemented within tuner 103 depicted in, FIG. 1, receives a frequency reference signal 201 at a phase detector 202, together with a feedback signal 203 representative of the synthesized frequency. Phase detector 202 generates an output signal proportional to a phase difference between the frequency reference signal 201 and the feedback signal 203. In the example shown, phase detector 202 generates a differential signal producing a number of up or down pulses within a given time period which indicates a time by which the feedback signal 203 leads or lags the reference signal 201 in phase (where up pulses indicate one of either leading or lagging and down pulses indicate the other).

The output of phase detector 202 is received by digital capacitance selection logic 204. Digital capacitance selection logic 204 employs the phase detector output to generate an n bit capacitance selection signal 205, where n may be any positive integer and is equal to six in the exemplary embodiment. Capacitance selection signal 205 may optionally be transmitted outside of tuner 103 for use by other functional units as described below.

Capacitance selection signal 205 is received by a switched-capacitor tuned oscillator 206, which generates a frequency output 207 tuned to a selected frequency, such as approximately 100 mega-Hertz (MHz). The frequency output 207 is employed in a feedback loop including, in the exemplary embodiment, a frequency divider 208 reducing the frequency output 207 to a fractional feedback signal 203. In the example shown, frequency divider 208 reduces the frequency of output 207 by a factor of ten, producing, for example, an approximately 10 MHz feedback signal 203.

Figures 3, 4:
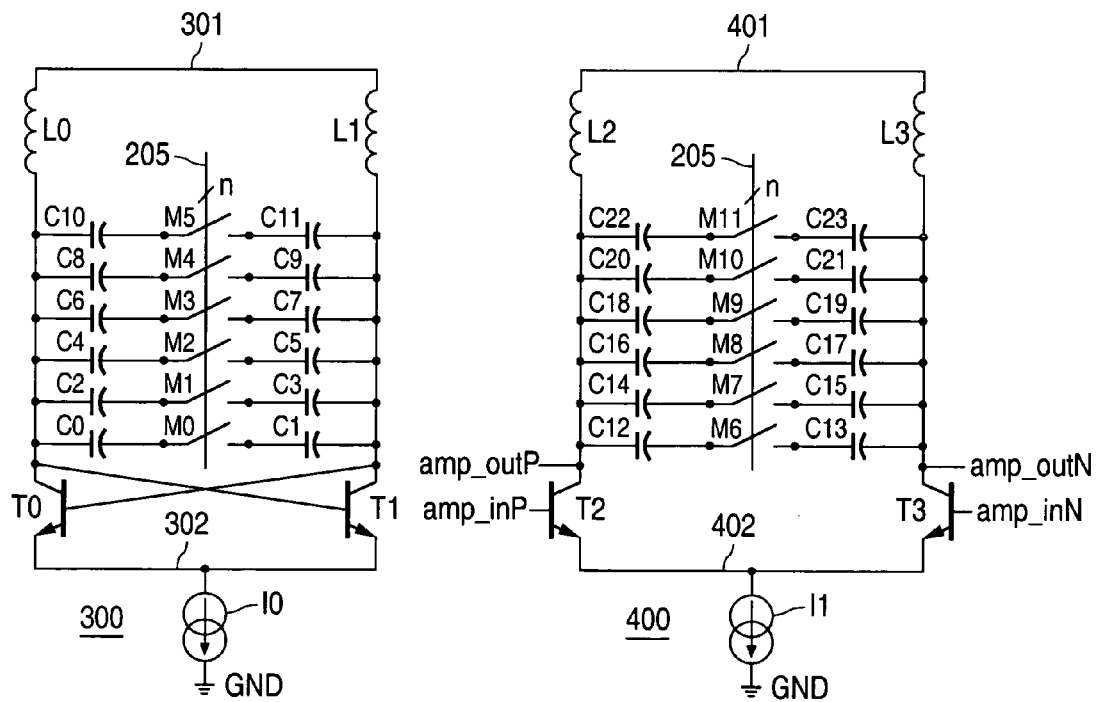
FIG. 3 is a circuit diagram of an oscillator stage for a switched-capacitor tuned oscillator according to one embodiment of the present invention.
FIG. 4 is a circuit diagram of an amplifier stage replicating the inductor-switched-capacitor resonant portion of a switched-capacitor tuned oscillator according to one embodiment of the present invention.

FIG. 3 is a circuit diagram of an oscillator stage for a switched-capacitor tuned oscillator according to one embodiment of the present invention. Oscillator stage 300 is employed within oscillator 206 depicted in FIG. 2, and includes two parallel branches containing inductors L0 and L1 and cross-coupled transistors T0 and T1 connected between nodes 301 and 302.

A set of switched capacitors C0-C11 is connected in parallel groups of two across the two branches from nodes 301 and 302, between the connection of inductor L0 to transistor T0 and the connection of inductor L1 to transistor T1. Each pair of capacitors C0-C1, C2-C3; C4-C5, C6-C7, C8-C9 and C10-C11 is connected to a corresponding switch M0-M5 that, when closed, completes connection of the capacitors to the resonant inductive-capacitive network formed by inductors L0 and L1 and one or more of capacitors C0-C11. Switches M0-M5 are controlled by the capacitance selection signal 205 generated by capacitance selection logic 204.

Those skilled in the art will recognize that a single inductor may be utilized instead of inductors L0 and L1, and that single capacitors may be employed in lieu of each of capacitor pairs C0-C1, C2-C3, C4-C5, C6-C7, C8-C9 and C10-C11. Moreover, the capacitance of capacitors C0-C11 may be uniform, or each capacitor pair C0-C1, C2-C3, C4-C5, C6-C7, C8-C9 and C10-C11 may have a different total capacitance value.

In one embodiment, a fixed capacitance (not shown) may be coupled to inductors L0-L1 in addition to capacitors C0-C11, establishing (together with any significant parasitic capacitance) a base frequency for oscillator stage 300, which is adjusted by selectively switching one or more of capacitor pairs C0-C1, C2-C3, C4-C5, C6-C7, C8-C9 and C10-C11 into the inductive-capacitive resonant network for oscillator stage 300. In another embodiment, a starting frequency is established by initially switching one or more of capacitor pairs C0-C1, C2-C3, C4-C5, C6-C7, C8-C9 and C10-C11 (e.g., some or all of switches M0-M5 are initially closed) into the inductive-capacitive resonant network. The frequency of oscillator stage 300 is then adjusted by switching one or more capacitor pairs C0-C1, C2-C3, C4-C5, C6-C7, C8-C9 and C10-C11 into or out of the circuit (i.e., opening and/or closing one or more of switches M0-M5).

When capacitor pairs C0-C1, C2-C3, C4-C5, C6-C7, C8-C9 and C10-C11 vary in total capacitance, one pair of capacitors C0-C1 may have a total capacitance for frequency alteration which corresponds to one "unit" (1×) of frequency adjustment—that is, the smallest capacitance which is switched into or out of the circuit in order to alter the resonant frequency of oscillator stage 300, or (stated differently) the smallest amount by which the resonant frequency may be altered. The capacitance selected may, for instance, correspond to the smallest phase difference between the reference frequency signal 201 and the feedback signal 202 that is represented by pulse(s) generated by phase detector 203.

In such a configuration, another pair of capacitors C2-C3 may have a total capacitance that is twice (2×) the total capacitance of capacitor pair C0-C1; a third pair of capacitors C4-C5 may have a total capacitance that is four times (4×) the total "unit" capacitance of capacitor pair C0-C1; a fourth capacitor pair C6-C7 may have a total capacitance of eight times (8×) that of capacitor pair C0-C1; a fifth capacitor pair C8-C9, sixteen times (16×) that of capacitor pair C0-C1; and the sixth capacitor pair C10-C11, thirty-two times (32×) the total capacitance of capacitors C0-C1.

The sequencing of total capacitances in doubles (or, correspondingly, in halves) for each capacitor pair C0-C1, C2-C3, C4-C5, C6-C7, C8-C9 and C10-C11 provides the most accurate frequency correction for a given number of bits. Thus, for example, the total capacitance of all capacitor pairs, when switches M0-M5 are all closed, may be selected to equal the capacitance corresponding to the desired range (the largest change in resonant frequency desired). One capacitor pair C10-C11 may have a total capacitance of approximately half the capacitance corresponding to the desired range, with the next capacitor pair C8-C9 having half that total capacitance, the third capacitor pair C6-C7 having half the total capacitance of the second capacitor pair C8-C9, and so on.

While the exemplary embodiment includes six capacitor pairs C0-C1, C2-C3, C4-C5, C6-C7, C8-C9 and C10-C11, the combination of both an approximate desired range and an approximate "unit" frequency adjustment corresponding to the smallest measurable phase difference may be achieved by increasing (or decreasing, as necessary) the number of capacitor pairs within the oscillator stage 300.

With an array of capacitors C0-C11 arranged as shown in parallel pairs, the capacitance selection signal 205 may effectively "address" selected capacitor pairs, alone or in combination. For example, the six bit capacitance selection signal 205 may close switch M0 alone, switch M1 alone, only switches M0 and M1 together, switch M2 alone, only switches M0 and M2, only switches M1 and M2, only switches M0-M2, etc. Therefore, where the total capacitance values of each capacitor pair are sequentially scaled from a minimum desired frequency change or a maximum desired range (e.g., halves or doubles as described above), capacitance selection logic 204 may include, at the output to which capacitance selection signal 205 is coupled, a simple up/down register (not shown) counting, for example, pulses within the output signal for phase detector 203 during a predetermined period. The number of pulses counted during the period is then transmitted, in binary form, as capacitance selection signal 205, and an appropriate total capacitance required to alter the frequency to the desired value is selected by closing (only) the switches corresponding to the binary pulse count.

The integrated circuit, inductor-capacitor based oscillator stage 300 can be tuned to RF frequencies without using nonlinear elements such as voltage-variable capacitors (varactors) and the like. The RF synthesizer loop 200 operates at the center frequency for the desired filter resonant frequency, or at a small offset from the center. The resonant LC network inductors L0-L1 and one or more pairs of capacitors C0-C11) within the oscillator stage 300 includes a digitally tunable capacitance value, with the synthesizer loop 200 increasing or decreasing the number of switched capacitor elements present within the resonant LC circuit until the desired frequency is locked to within a finite quantization error.

Tunability of the capacitor for the oscillator stage 300 is achieved by separating the capacitor into a much larger number of individual capacitances, not necessarily of equal value, each of which may be switched in or out of the circuit by means of digitally controlled switches. To avoid substantially reducing the linearity or quality (Q) of the capacitor and associated resonant filter, the switches should be low-impedance and placed between the capacitor and a virtual ground. The mechanism of the present invention is therefore substantially different from conventional varactor-based frequency tuning of RF oscillators, or from bias current based tuning of ring oscillators.

FIG. 4 is a circuit diagram of an amplifier stage replicating the inductor-switched-capacitor resonant portion of a switched-capacitor tuned oscillator according to one embodiment of the present invention. Like oscillator stage 300, amplifier stage 400 includes two parallel branches containing inductors L2 and L3 and transistors T2 and T3 connected between nodes 401 and 402, with a set of switched capacitors C12-C23 connected in parallel pairs across the two branches, with node 402 coupled to a ground GND by a current source I1. Capacitors C12-C23 are switched into or out of the resonant inductive-capacitive portion of amplifier stage 400 by closing or opening corresponding switches M6-M11 controlled by the same capacitance selection signal 205 controlling switches M0-M5 in the oscillator stage 300. Rather than being cross-coupled, transistors T2-T3 provide differential inputs amp_in P and amp_in N for the oscillator stage 400. Differential outputs amp_outP and amp_outN are taken from the parallel branch connections of inductors L2-L3 and transistors T2-T3.

Since inductance and capacitance typically do not vary appreciably across a particular integrated circuit (although often varying widely from wafer to wafer or from lot to lot), the replica of the inductor-switched-capacitor resonant filter portion of the oscillator stage 300 may be employed as a frequency-selective load within the amplifier stage 400, or as a passive filter or matching network within or outside of the amplifier stage 400. Moreover, by cascading multiple stages each replicating the inductor-switched-capacitor resonant circuit with ratioed inductance-capacitance (LC) values, a higher order passive, on-chip ladder filter may be realized.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. An integrated circuit comprising:
    an oscillator circuit including a set of capacitors each selectively switched either into or out of a first resonant circuit; and
    at least one amplifier stage coupled to the oscillator circuit and including a set of capacitors each selectively switched either into or out of a second resonant circuit,
    wherein the capacitors within the at least one amplifier stage replicate the capacitors within the oscillator circuit.

2. The integrated circuit according to claim 1, wherein the capacitors within the amplifier stage are switched in tandem with corresponding capacitors within the oscillator circuit.

3. The integrated circuit according to claim 2, further comprising a capacitance selection signal switching both the capacitors in the oscillator circuit into or out of the first resonant circuit and the capacitors in the at least one amplifier stage into or out of the second resonant circuit.

4. The integrated circuit according to claim 2, wherein the at least one amplifier stage further comprises a plurality of cascaded amplifier stages forming a ladder filter.

5. The integrated circuit according to claim 2, wherein the second resonant circuit comprises a frequency-selective load.

6. The integrated circuit according to claim 2, wherein the oscillator circuit comprises two parallel branches each including an inductor and a transistor, wherein the capacitors in the oscillator circuit are connected between the two parallel branches and wherein the transistors are cross-coupled.

7. The integrated circuit according to claim 2, wherein the at least one amplifier stage comprises two parallel branches each including an inductor and a transistor, wherein the capacitors in the at least one amplifier stage are connected between the two parallel branches.

8. The integrated circuit according to claim 1, wherein each of the sets of capacitors within the oscillator circuit and the at least one amplifier stage comprises a sequence of varying capacitances each equal to a multiple of an adjacent capacitance within that sequence, wherein each of the sequences is scaled from a capacitance corresponding to a maximum frequency adjustment, a capacitance corresponding to a minimum frequency adjustment, or both.

9. The integrated circuit according to claim 1, wherein each of the oscillator circuit and the at least one amplifier stage comprises n parallel branches, and wherein the capacitors within each set are switched into or out of the first or second resonant circuit by an n-bit binary count of pulses representative of a difference between a resonant frequency for the first resonant circuit and a reference frequency.

10. A receiver including the integrated circuit according to claim 1, the receiver comprising:

a connection for coupling the receiver to an antenna configured to receive wireless signals; and an integrated circuit tuner coupled to the connection, the integrated circuit tuner including the oscillator circuit and the at least one amplifier stage and further comprising:

a capacitance selection controller configured to:

receive a signal representative of a difference between a resonant frequency of the first resonant circuit and a reference frequency; and control switching of one or more of the capacitors in both the oscillator circuit and the at least one amplifier stage in response to the difference between the resonant and reference frequencies to alter the resonant frequency towards the reference frequency.

11. A method of operating an integrated circuit comprising:

selectively switching any of a set of capacitors either into or out of a first resonant circuit within an oscillator circuit; and selectively switching any of a set of capacitors either into or out of a second resonant circuit within at least one amplifier stage coupled to the oscillator circuit, wherein the capacitors within the at least one amplifier stage replicate the capacitors within the oscillator circuit.

12. The method according to claim 11, wherein the switching steps comprise:

switching the capacitors within the amplifier stage in tandem with corresponding capacitors within the oscillator circuit.

13. The method according to claim 12, further comprising:

generating a capacitance selection signal for switching both the capacitors in the oscillator circuit into or out of the first resonant circuit and the capacitors in the at least one amplifier stage into or out of the second resonant circuit.

14. The method according to claim 12, wherein the at least one amplifier stage further comprises a plurality of cascaded amplifier stages forming a ladder filter.

15. The method according to claim 12, wherein the second resonant circuit comprises a frequency-selective load.

16. The method according to claim 12, wherein the oscillator circuit comprises two parallel branches each including an inductor and a transistor, wherein the capacitors in the oscillator circuit are connected between the two parallel branches and wherein the transistors are cross-coupled.

17. The method according to claim 12, wherein the at least one amplifier stage comprises two parallel branches each including an inductor and a transistor, wherein the capacitors in the at least one amplifier stage are connected between the two parallel branches.

18. The method according to claim 11, wherein each of the sets of capacitors within the oscillator circuit and the at least one amplifier stage comprises a sequence of varying capacitances each equal to a multiple of an adjacent capacitance within that sequence, wherein each of the sequences is scaled from a capacitance corresponding to a maximum frequency adjustment, a capacitance corresponding to a minimum frequency adjustment, or both.

19. The method according to claim 11, wherein each of the oscillator circuit and the at least one amplifier stage comprises n parallel branches, and wherein the capacitors within each set are switched into or out of the first or second resonant circuit by an n-bit binary count of pulses representative of a difference between a resonant frequency for the first resonant circuit and a reference frequency.

20. The method according to claim 11, further comprising:

receiving wireless signals at a connection coupling a receiver including the oscillator circuit and the at least one amplifier stage to an antenna; and tuning an integrated circuit tuner coupled to the connection using the oscillator circuit and the at least one amplifier stage by:

receiving a signal representative of a difference between a resonant frequency of the first resonant circuit and a reference frequency; and controlling switching of one or more of the capacitors in both the oscillator circuit and the at least one amplifier stage in response to the difference between the resonant and reference frequencies to alter the resonant frequency towards the reference frequency.

* * * * *

UNITED STATES PATENT AND TRADEMARK OFFICE
CERTIFICATE OF CORRECTION

PATENT NO.        : 7,643,809 B1  
APPLICATION NO. : 11/220073  
DATED             : January 5, 2010  
INVENTOR(S)       : Daniel R. Meacham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1083 days.

Signed and Sealed this

Twenty-first Day of December, 2010

David J. Kappos  
*Director of the United States Patent and Trademark Office*